United States Patent
Yang

(10) Patent No.: US 10,527,180 B2
(45) Date of Patent: Jan. 7, 2020

(54) FAUCET CARTRIDGE

(71) Applicant: Tsai-Chen Yang, Taichung (TW)

(72) Inventor: Tsai-Chen Yang, Taichung (TW)

( * ) Notice: Subject to any disclaimer, the term of this patent is extended or adjusted under 35 U.S.C. 154(b) by 0 days.

(21) Appl. No.: 16/015,933

(22) Filed: Jun. 22, 2018

(65) Prior Publication Data

US 2018/0299018 A1    Oct. 18, 2018

Related U.S. Application Data

(63) Continuation-in-part of application No. 15/219,830, filed on Jul. 26, 2016, now abandoned.

(51) Int. Cl.
| | |
|---|---|
| *G05D 23/13* | (2006.01) |
| *F16K 11/078* | (2006.01) |
| *F16K 11/074* | (2006.01) |

(52) U.S. Cl.
CPC ...... *F16K 11/0787* (2013.01); *F16K 11/0743* (2013.01); *G05D 23/1353* (2013.01); *F16K 11/0782* (2013.01); *G05D 23/13* (2013.01); *G05D 23/132* (2013.01); *G05D 23/134* (2013.01); *G05D 23/1306* (2013.01); *G05D 23/1346* (2013.01)

(58) Field of Classification Search
CPC ............... G05D 23/13; G05D 23/1346; G05D 23/1353; G05D 23/1306; G05D 23/132; G05D 23/134; F16K 11/0782
See application file for complete search history.

(56) References Cited

U.S. PATENT DOCUMENTS

| | | | |
|---|---|---|---|
| 5,148,976 A | 9/1992 | Reid | |
| 6,325,295 B1* | 12/2001 | Lorch | G05D 23/1353 |
| | | | 137/269 |
| 6,454,175 B1 | 9/2002 | Lorch | |
| 6,585,167 B2 | 7/2003 | Wolber et al. | |
| 7,163,157 B2 | 1/2007 | Goncze et al. | |
| 8,074,893 B2 | 12/2011 | Mace | |
| 8,740,097 B2* | 6/2014 | Platet | G05D 23/1353 |
| | | | 236/12.11 |
| 9,134,737 B2 | 9/2015 | Menet | |
| 2002/0130189 A1* | 9/2002 | Mace | F16K 11/0743 |
| | | | 236/12.1 |
| 2006/0243813 A1 | 11/2006 | Beck | |
| 2008/0257969 A1 | 10/2008 | Nember | |
| 2011/0168790 A1 | 7/2011 | Knapp | |

(Continued)

FOREIGN PATENT DOCUMENTS

| | | |
|---|---|---|
| TW | 514182 U | 12/2002 |
| TW | M471523 U | 2/2014 |

*Primary Examiner* — Matthew W Jellett
*Assistant Examiner* — Christopher D Ballman
(74) *Attorney, Agent, or Firm* — Muncy, Geissler, Olds & Lowe, PC

(57) ABSTRACT

The faucet of cartridge has an expandable temperature regulating rod in the main body. The temperature of water is regulated by changing the ratio of cold water and hot water by the movement of the temperature regulating rod. The water can be switched on or off by rotating the main body with respect to the seat. The main body includes an outer body, an inner body, and an anti-leaking element. The anti-leaking element is sandwiched between the outer body and the inner body to partition the space therebetween into two channels for cold and hot water to flow into the inner body.

5 Claims, 5 Drawing Sheets

(56) References Cited

U.S. PATENT DOCUMENTS

2013/0001259 A1 1/2013 Lin
2015/0220090 A1 8/2015 Ottelli
2016/0018831 A1 1/2016 Lamb et al.

* cited by examiner

FAUCET CARTRIDGE

FIELD OF THE INVENTION

The present invention is a CIP of application Ser. No. 15/219,830, filed Jul. 26, 2016, the entire contents of which are hereby incorporated by reference.

BACKGROUND OF THE INVENTION

Description of the Prior Art

A conventional faucet cartridge is disclosed in patent TW 514182. A knob is disposed above a seat having an outlet. The knob is screwed with a retaining sleeve having a through hole. A cavity is formed between the retaining sleeve and the seat. The retaining sleeve encloses a water room. An operating rod and a spring are set on a plate. A spring and a sliding piece are set in a valve body having a cold water inlet and a hot water inlet. The sliding piece has a plurality of holes and a receiving seat. The valve body is set under the seat. An end of the operating rod is set on the receiving seat. Thereby, the expandable operating rod can adjust the ratio of cold water and hot water to regulate the temperature of mixed water. However, the faucet cartridge has to be connected with a faucet so as to be too bulky.

Besides, the patent TW M471523 also disclosed a faucet cartridge. However, the outer body includes an outer layer and an inner layer so as to have a complicated structure. The inner body has to be further installed into the inner layer. Thus, installation is difficult.

Patent publication US 2011/0168790 disclosed a thermostatic mixer device. However, the envelope has an extremely complicated structure to be difficult to manufacture. Besides, the envelope has to be inserted into the tubular member first before inserting the distributor bottom members into the tubular member. Thus, installation is difficult.

SUMMARY OF THE INVENTION

The main object of the present invention is to provide a faucet cartridge which is able to completely separate cold water and hot water and is easy to install.

To achieve the above and other objects, the faucet cartridge of the present invention includes a main body, a seat, a temperature regulating structure, and a control structure.

The main body defines a longitudinal direction and a radial direction and includes a top cover, an outer body, an inner body, and an anti-leaking element. The top cover is disposed on a top of the outer body. The inner body is independent from the outer body and is received in the outer body. The anti-leaking element is sandwiched between the inner body and the outer body to partition a space between the inner body and the outer body along a circumferential direction of the main body into two separated spaces. The two separated spaces are a first channel and a second channel respectively. Each of the first channel and the second channel extends downward along the longitudinal direction. The inner body encloses a cavity and has a first inlet hole and a second inlet hole. The first inlet hole is located below the second inlet hole. The first channel communicates with the cavity via the first inlet hole, and the second channel communicates with the cavity via the second inlet hole.

The seat is disposed on a bottom of the main body and is rotatable with respect to the main body. The seat has a water outlet, a hot water inlet, and a cold water inlet. The cavity communicates with exterior via the water outlet. The first channel corresponds to the hot water inlet, and the second channel corresponds to the cold water inlet. The hot water inlet and the cold water inlet communicates with or discommunicates with the first channel and the second channel respectively when the hot water inlet and the cold water inlet stagger from or align with the first channel and the second channel respectively by rotating the outer body.

The temperature regulating structure includes a temperature regulating rod which is expandable, a blocking element, and a first elastic element. The temperature regulating rod, the blocking element, and the first elastic element are arranged in the cavity. The blocking element has at least one through hole for water to flow through. The blocking element is adapted for blocking the first inlet hole and the second inlet hole. The temperature regulating rod and the blocking element are linked-up. Diameters of the first inlet hole and the second inlet hole are oppositely alternated when the blocking element is moved by the expanding temperature regulating rod. The first elastic element pushes one of the temperature regulating rod and the blocking element so that the temperature regulating rod and the blocking element tend to move upward.

The control structure includes a control axle, a follower element, a second elastic element, and a pushing element. The control axle is rotatably inserted into the top cover. The follower element is movably disposed on the top cover and is screwed with the control axle. The follower element encloses a space in which the second elastic element and the pushing element are arranged. The second elastic element pushes the pushing element to abut against the temperature regulating rod.

The inner body is inserted into the outer body from the bottom of the outer body. The temperature regulating structure is inserted into the inner body via the top of the outer body. A bottom of the control structure is inserted into the top cover from a bottom of the top cover. A bottom of the top cover is inserted into the outer body to be fixed with the outer body so that the outer cover is closed and that the pushing element abuts against the temperature regulating rod. The bottom of the outer body is inserted into the seat from a top of the seat.

Thereby, the faucet cartridge of the present invention has switch mechanism, temperature auto-regulation mechanism, and temperature adjusting mechanism. In addition, the structure of the present invention is simple and easy to install. Besides, cold water and hot water are completely separated before blending.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
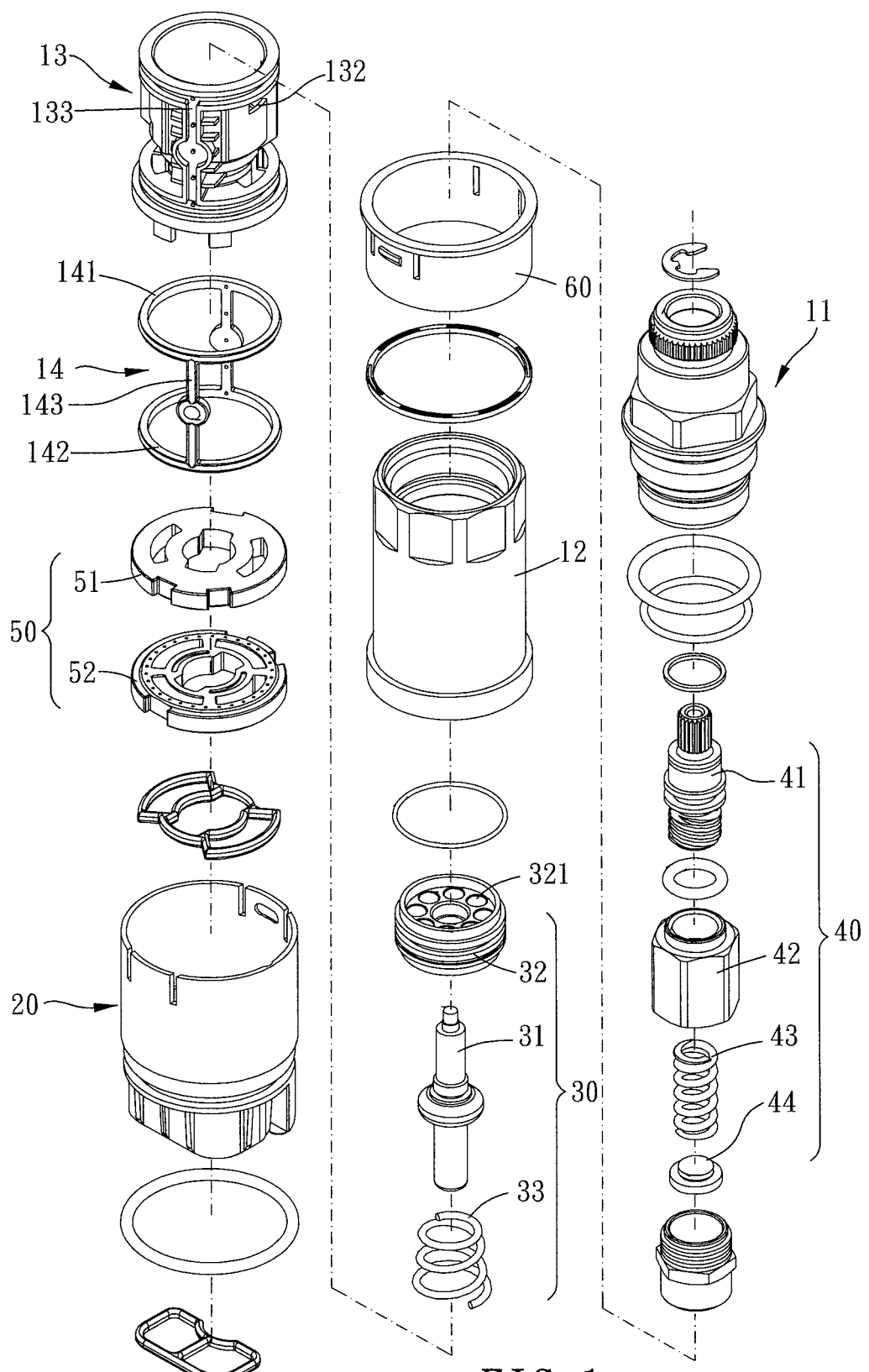
FIG. 1 is a stereogram of the present invention.
Figure 2:
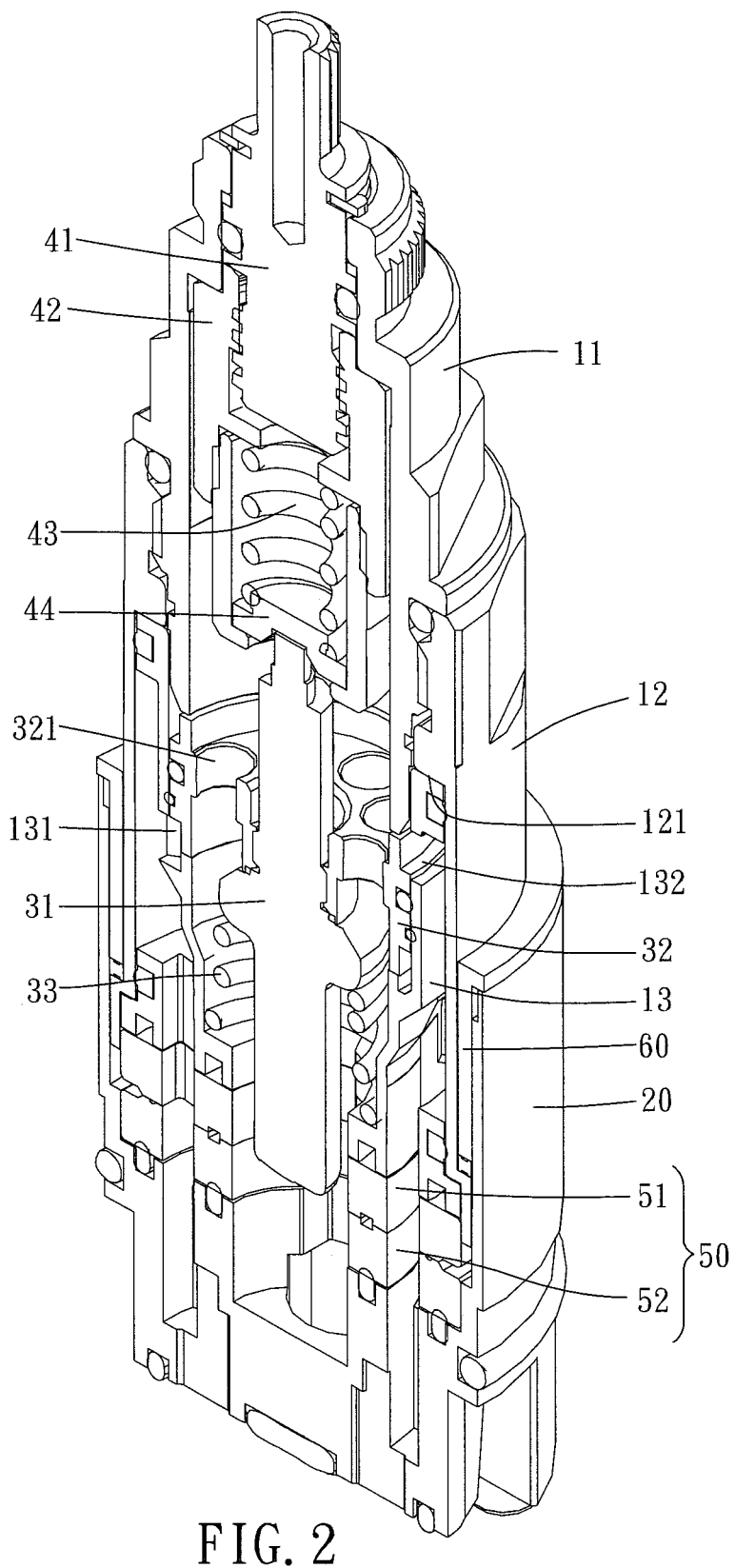
FIG. 2 is a profile of the present invention.
Figure 3:
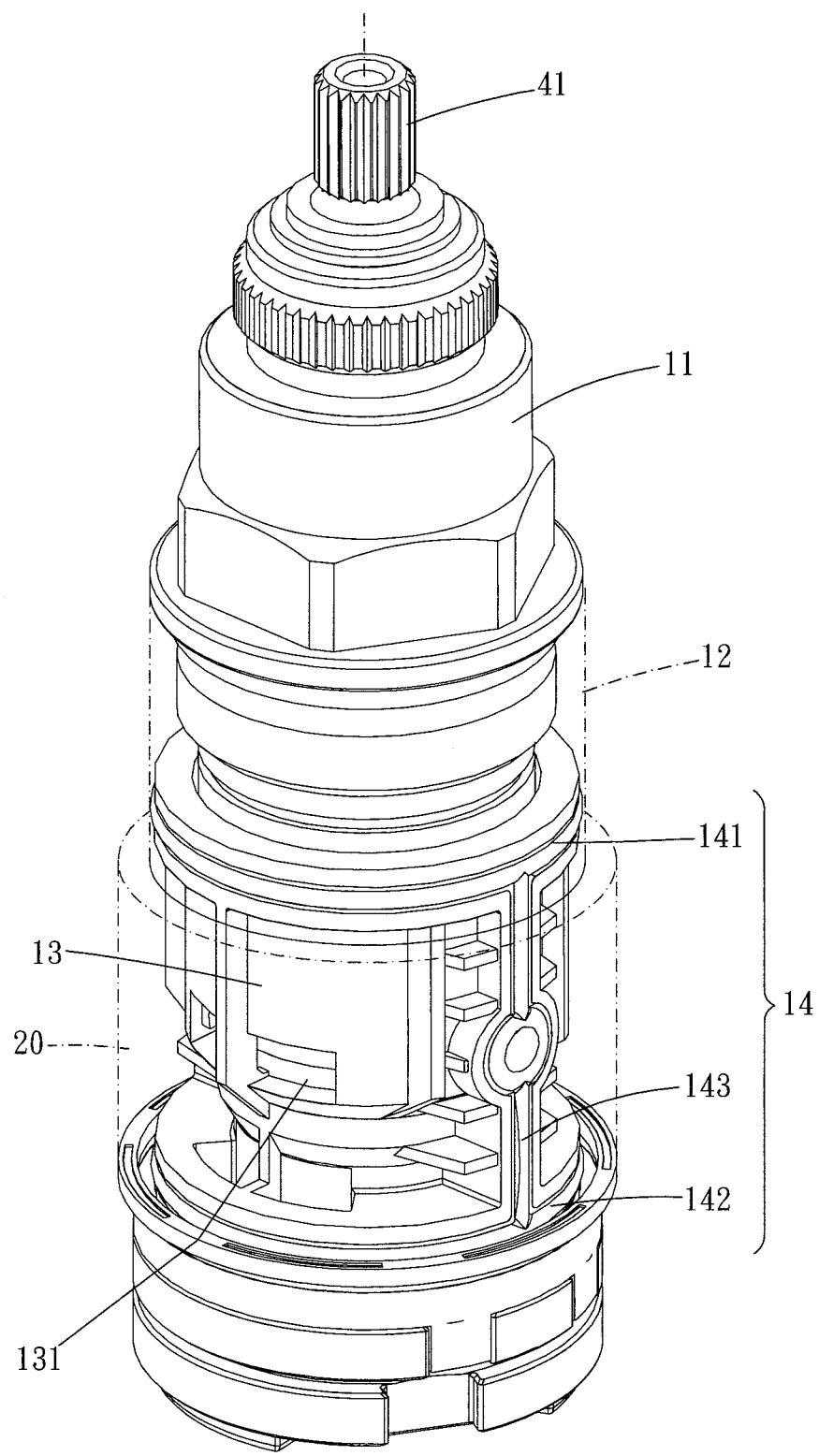
FIG. 3 is a partial perspective view of the present invention.
Figure 4:
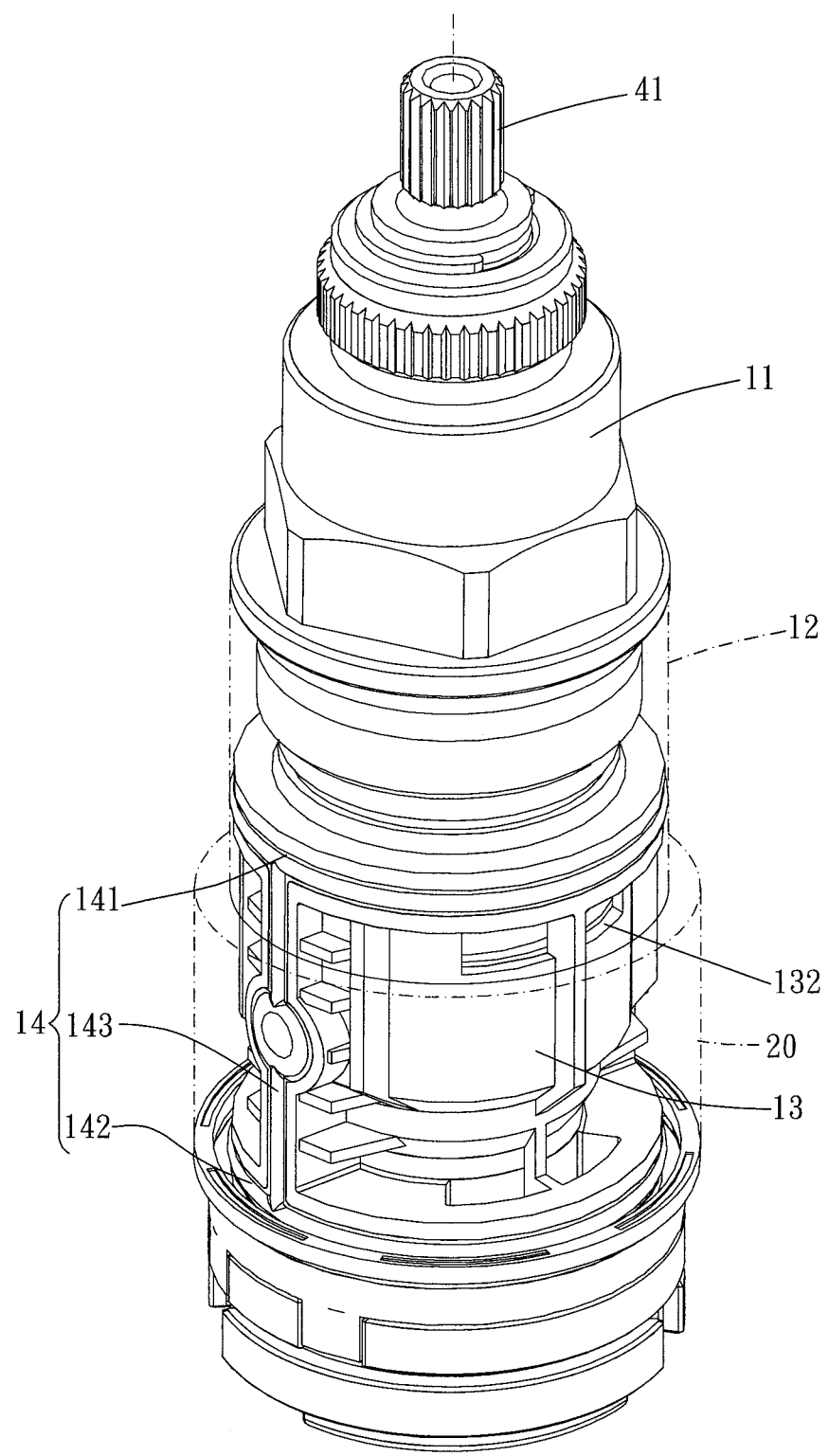
FIG. 4 is a partial perspective view of the present invention at another angle.
Figure 5:
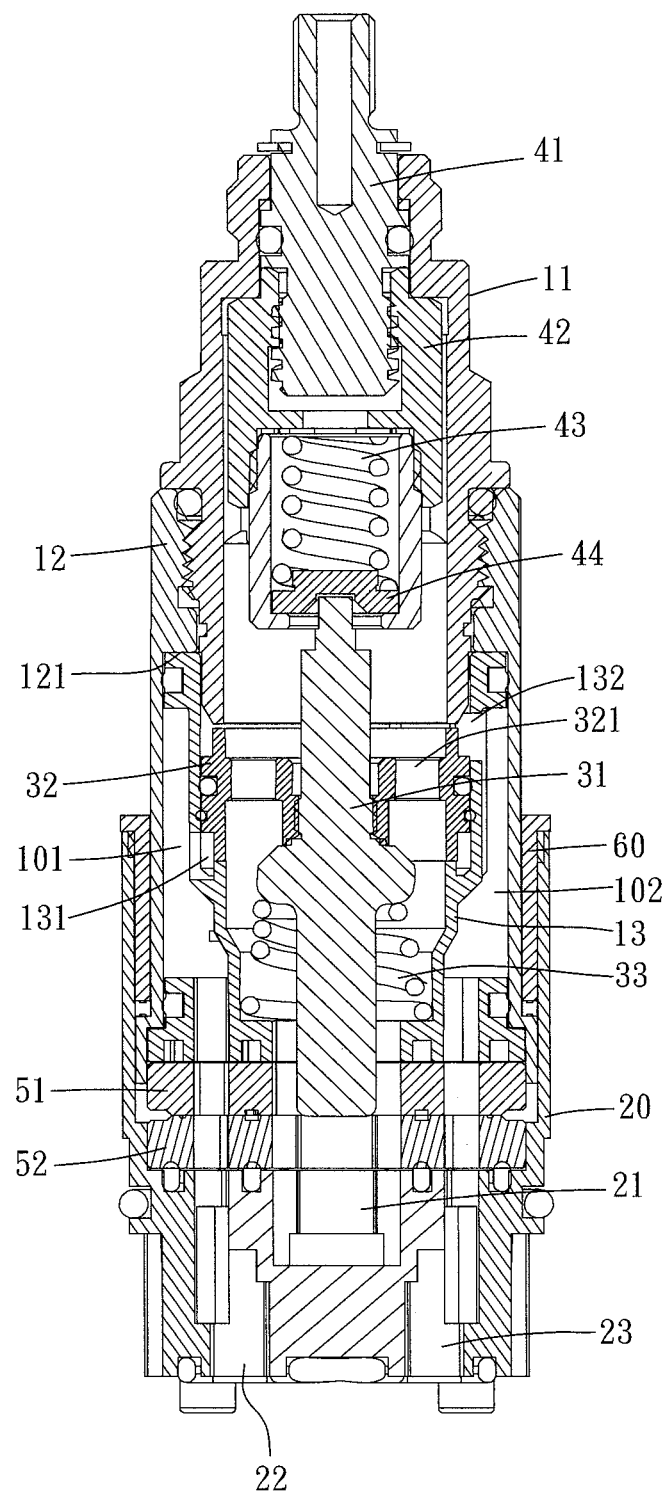
FIG. 5 is a profile of the present invention.

Please refer to FIG. 1 to FIG. 5, the faucet cartridge of the present invention includes a main body, a seat 20, a temperature regulating structure 30, and a control structure 40.

The main body defines a longitudinal direction and a radial direction and includes a top cover 11, an outer body 12, an inner body 13, and an anti-leaking element 14. The top cover 11 is disposed on a top of the outer body 12. The inner body 13 is received in the outer body 12 and is independent from the outer body 12. The anti-leaking element 14 is sandwiched between the outer body 12 and the inner body 13 to partition the space between the outer body 12 and the inner body 13 along a circumferential direction of the main body into two separated spaces. The two separated spaces are a first channel 101 and a second channel 102 respectively. Each of the first channel 101 and the second channel 102 extends downward along the longitudinal direction. The inner body 13 encloses a cavity therein and has a first inlet hole 131 and a second inlet hole 132. The first inlet hole 131 is located below the second inlet hole 132. The first channel 101 communicates with the cavity via the first inlet hole 131, and the second channel 102 communicates with the cavity via the second inlet hole 132. In the present embodiment, the anti-leaking element 14 includes an upper ring 141, a lower ring 142, and two longitudinal portions 143. The upper ring 141 and the lower ring 142 are spacedly arranged along the longitudinal direction. Each longitudinal portion 143 connects the upper ring 141 and the lower ring 142 therebetween. The two longitudinal portions 143 are apart from each other to be located at two ends along the radial direction. The anti-leaking element 14 is sleeved onto the inner body 13 to be sandwiched between the inner body 13 and the outer body 12. Preferably, the inner body 13 is formed with a groove 133 on the outer surface thereof. The groove 133 has a shape corresponding to the shape of the anti-leaking element 14 so that the anti-leaking element 14 is set in the groove 133. Preferably, the anti-leaking element 14 is made of rubber. Besides, the outer body 12 can be disposed with a handle for a user to hold.

The seat 20 is disposed on a bottom of the main body and is rotatable with respect to the main body. The seat 20 has a water outlet 21, a hot water inlet 22, and a cold water inlet 23. The cavity communicates with exterior by the water outlet 21. The first channel 101 corresponds to the hot water inlet 22, and the second channel 102 corresponds to the cold water inlet 23. When the first channel 101 and the second channel 102 stagger from or align with the hot water inlet 22 and the cold water inlet 23 by rotating the outer body 12, the hot water inlet 22 and the cold water inlet 23 discommunicate or communicate with the first channel 101 and the second channel respectively. That is, the flow can be adjusted by rotating the outer body 12 various angles.

The temperature regulating structure 30 includes a temperature regulating rod 31 which is expandable, a blocking element 32, and a first elastic element 33. The temperature regulating rod 31, the blocking element 32, and the first elastic element 33 are received in the cavity. The blocking element 32 has at least one through hole 321 for water to flow through. The blocking element 32 is adapted for block the first inlet hole 131 and the second inlet hole 132. The temperature regulating rod 31 is linked-up with the blocking element 32. When the temperature regulating rod 31 is expanded or shrunk, the blocking element 32 is moved to alternate the diameters of the first inlet hole 131 and the second inlet hole 132. The first elastic element 33 pushes one of the temperature regulating rod 31 and the blocking element 32 to make it tend to move upward.

The control structure 40 includes a control axle 41, a follower element 42, a second elastic element 43, and a pushing element 44. The control axle 41 is rotatably inserted into the top cover 11. The follower element 42 is movably disposed on the top cover 11 and is screwed with the control axle 41. The follower element 42 encloses a space, and the second elastic element 43 and the pushing element 44 are received in the space. The second elastic element 43 pushes the pushing element 44 to abut against the temperature regulating rod 31. Specifically, an end of the control axle 41 penetrates the top cover 11 and is exposed outside for holding. The temperature regulating rod 31 is kept abutting against the pushing element 44 due to the first elastic element 33 and the second elastic element 43. Thus, the temperature regulating rod 31 and the blocking element 32 are kept at a specific position.

The inner body 13 is inserted into the outer body 12 from the bottom of the outer body 12. The temperature regulating structure 40 is inserted into the inner body 13 via the top of the outer body 12. A bottom of the control structure 40 is inserted into the top cover 11 from a bottom of the top cover 11. A bottom of the top cover 11 is inserted into the outer body 12 to be fixed with the outer body 12 so that the outer cover 12 is closed and that the pushing element 44 abuts against the temperature regulating rod 31. The bottom of the outer body 12 is inserted into the seat 20 from a top of the seat 20. That is, the main body, the temperature regulating structure, and the control structure form an operation assembly, and the operation assembly is further inserted into the seat to complete installation. Thus, installation becomes easier.

To improve the adaptation between the main body and the seat, two ceramic discs 50 received in the seat 20 are included. The two ceramic discs 50 include a movable disc 51 and a fixed disc 52. The movable disc 51 is linked-up with the bottom of the inner body 13, and the fixed disc 52 is linked-up with the seat 20. Each ceramic disc 50 is formed with a plurality of holes corresponding to the water outlet 21, the hot water inlet 22, and the cold water inlet 23.

To facilitate the installation, the outer body 12 has a stepped face 121 facing downward on the inner wall thereof near the top of the outer body 12. The inner body 13 is inserted into the outer body 12 upward via the bottom of the outer body 12 to abut against the stepped face 121.

Preferably, the seat 20 covers the bottom half of the outer body 12. An outer cover 60 is sandwiched between the outer body 12 and the seat and is fixed with the seat 20.

In use, hot water and cold water enter via the hot water inlet 22 and the cold water inlet 23 respectively. The hot water further enters the cavity via the first channel 101 and the first inlet hole 131, and the cold water further enters the cavity via the second channel 102 and the second inlet hole 132. And then, cold water and hot water are mixed in the cavity, and the mixed water is discharged by the water outlet 21.

By rotating the outer body 12, the inlets and the channels stagger to cut the water supply. Thereby, the flow can be also adjusted. Besides, by rotating the control axle 41 to push the temperature regulating rod 31, the original position of the blocking element 32 can be adjusted so as to regulate the temperature of mixed water.

When the mixed water is too hot, the temperature regulating rod 31 expands to drive the blocking element 32 to move downward so that the first inlet hole 131 is blocked more and that the second inlet 132 is blocked less. Thus, the flow of cold water increases, and the flow of hot water decreases so as to regulate the temperature of the mixed water, and vice versa.

In conclusion, the faucet cartridge of the present invention has a simple structure and is easy to install. In addition, the flow and the temperature of water are adjusted, and the temperature of water is auto-regulated.

What is claimed is:

1. A faucet cartridge, including:
   a main body, defining a longitudinal direction and a radial direction, including a top cover, an outer body, an inner body, and an anti-leaking element, the top cover being disposed on a top of the outer body, the inner body being independent from the outer body and being received in the outer body, the anti-leaking element being sandwiched between the inner body and the outer body to partition a space between an outer wall of the inner body and an inner wall of the outer body along a circumferential direction of the main body into two separated spaces, the two separated spaces being a first channel and a second channel respectively, each of the first channel and the second channel extending downward along the longitudinal direction, the inner body enclosing a cavity and having a first inlet hole and a second inlet hole, the first inlet hole being located below the second inlet hole, the first channel communicating with the cavity via the first inlet hole, the second channel communicating with the cavity via the second inlet hole;
   a seat, disposed on a bottom of the main body, being rotatable with respect to the main body, the seat having a water outlet, a hot water inlet, and a cold water inlet, the cavity communicating with exterior via the water outlet, the first channel corresponding to the hot water inlet, the second channel corresponding to the cold water inlet, the hot water inlet and the cold water inlet communicating with or discommunicating with the first channel and the second channel respectively when the hot water inlet and the cold water inlet stagger from or align with the first channel and the second channel respectively by rotating the outer body;
   a temperature regulating structure, including a temperature regulating rod which is expandable, a blocking element, and a first elastic element, the temperature regulating rod, the blocking element, and the first elastic element being arranged in the cavity, the blocking element having at least one through hole for water to flow through, the blocking element being adapted for blocking the first inlet hole and the second inlet hole, the temperature regulating rod and the blocking element being linked-up, diameters of the first inlet hole and the second inlet hole being oppositely alternated when the blocking element is moved by the expanding temperature regulating rod, the first elastic element pushing one of the temperature regulating rod and the blocking element so that the temperature regulating rod and the blocking element tend to move upward;
   a control structure, including a control axle, a follower element, a second elastic element, and a pushing element, the control axle being rotatably inserted into the top cover, the follower element being movably disposed on the top cover and being screwed with the control axle, the follower element enclosing a space in which the second elastic element and the pushing element are arranged, the second elastic element pushing the pushing element to abut against the temperature regulating rod;
   wherein the inner body is inserted into the outer body from the bottom of the outer body, the temperature regulating structure is inserted into the inner body via the top of the outer body, a bottom of the control structure is inserted into the top cover from a bottom of the top cover, a bottom of the top cover is inserted into the outer body to be fixed with the outer body so that the outer cover is closed and that the pushing element abuts against the temperature regulating rod, the bottom of the outer body is inserted into the seat from a top of the seat;
   wherein the anti-leaking element is integrally formed by an upper ring, a lower ring, and two longitudinal portions, the upper ring and the lower ring are spacedly arranged along the longitudinal direction, each longitudinal portion extends along the longitudinal direction and connects the upper ring and the lower ring therebetween, the two longitudinal portions are away from each other to be located at two ends along the radial direction, the anti-leaking element is sleeved on the inner body to be sandwiched between the inner body and the outer body, the inner body is formed with a groove on an outer surface thereof, the groove has a shape corresponding to a shape of the anti-leaking element, the anti-leaking element is set in the groove, the two longitudinal portions partition the space between the outer wall of the inner body and the inner wall of the outer body along the circumferential direction of the main body into the first channel and the second channel so that the first channel and the second channel are separated by a plane parallel to the longitudinal direction.

2. The faucet cartridge of claim 1, wherein the anti-leaking element is made of rubber.

3. The faucet cartridge of claim 1, further including two ceramic discs arranged in the seat, the two ceramic discs including a movable disc and a fixed disc, the movable disc being linked-up with a bottom of the inner body, the fixed disc being linked-up with the seat, each ceramic disc being formed with holes corresponding to the water outlet, the hot water inlet, and the cold water inlet.

4. The faucet cartridge of claim 1, wherein an inner wall of the outer body has a stepped face facing downward at an end near the top of the outer body, the inner body is inserted upward into the outer body from a bottom of the outer body to abut against the stepped face.

5. The faucet cartridge of claim 1, further including an outer cover, the seat covering a lower part of the outer body, the outer cover being sandwiched between the outer body and the seat and being fixed to the seat.

* * * * *